United States Patent
Rebordosa et al.

(10) Patent No.: US 6,398,403 B1
(45) Date of Patent: Jun. 4, 2002

(54) BELL-SHAPED SHIELD FOR USE ON A HOUSEHOLD APPLIANCE, PARTICULARLY A HAND BLENDER OR A HAND MIXER

(75) Inventors: Antonio Rebordosa, Sant Fruitós de Bages; Mariano Peñaranda, Barcelona; Alejandro Hernandez, El Vendrell; Frances Carreras, Sant Just Desvern; Anna Butinyà, Banyoles, all of (ES)

(73) Assignee: Braun GmbH (DE)

( * ) Notice: Subject to any disclaimer, the term of this patent is extended or adjusted under 35 U.S.C. 154(b) by 0 days.

(21) Appl. No.: 09/991,743

(22) Filed: Nov. 23, 2001

Related U.S. Application Data

(63) Continuation of application No. 09/641,734, filed on Aug. 18, 2000, now abandoned, which is a continuation of application No. PCT/EP99/01656, filed on Mar. 13, 1999.

(30) Foreign Application Priority Data

Mar. 21, 1998 (DE) .......................... 198 12 541

(51) Int. Cl.⁷ ................. A47J 43/044; A47J 43/07
(52) U.S. Cl. ............................................ 366/129
(58) Field of Search .................. 366/129, 130, 366/197, 331, 342, 343; 99/348; 416/63, 244 R; D7/376–380, 413

(56) References Cited

U.S. PATENT DOCUMENTS

| | | |
|---|---|---|
| 2,805,050 A | 9/1957 | Choppinet |
| 2,940,738 A | 6/1960 | Posener et al. |
| 3,117,769 A | 1/1964 | Spingler |
| 3,299,924 A | 1/1967 | Hanschitz |
| 3,333,830 A | 8/1967 | Spingler et al. |
| 3,724,765 A | 4/1973 | Rohrbaugh et al. |
| 4,405,998 A | 9/1983 | Brison ................. 366/343 |
| D271,176 S | 11/1983 | Zimnowicz ................. D7/379 |
| 4,850,699 A | 7/1989 | Rebordosa ................. 366/129 |
| D308,001 S | 5/1990 | Ricard ................. D7/376 |
| D314,489 S | 2/1991 | Van Deursen et al. ...... D7/379 |
| D322,008 S | 12/1991 | Littmann ................. D7/376 |
| D323,955 S | 2/1992 | Rixen ................. D7/376 |
| D327,603 S | 7/1992 | Van Asten ................. D7/376 |
| 5,129,589 A | 7/1992 | Papaleo et al. |
| D345,075 S | 3/1994 | Saltet ................. D7/376 |
| D345,076 S | 3/1994 | Saltet ................. D7/376 |
| 5,316,382 A | 5/1994 | Penaranda et al. ......... 366/129 |
| D348,587 S | 7/1994 | Saltet ................. D7/376 |

(List continued on next page.)

FOREIGN PATENT DOCUMENTS

| | | | |
|---|---|---|---|
| AT | 241729 | 8/1965 | ................. 366/129 |
| BE | 557983 | 6/1957 | |
| BE | 562409 | 12/1957 | ................. 366/129 |

(List continued on next page.)

OTHER PUBLICATIONS

"Mixgerat", Neues Aus Der Technik, No. 7/8, Aug. 1, 1959, p. 4.

Primary Examiner—Charles E. Cooley
(74) Attorney, Agent, or Firm—Fish & Richardson P.C.

(57) ABSTRACT

A bell-shaped shield for use on a household appliance, particularly a hand blender or a hand mixer has an inner wall that forms a space which is accessible from below via an opening through which food is supplied and discharged. A blade-like processing tool inside the space is adapted to be set in rotation by a drive shaft so that the food is caught, comminuted and/or mixed by said tool. The surface of the inner wall has on its circumference individual outwardly extending wall sections for the formation of clearance spaces, said wall sections serving primarily for the diversion, comminution and enhanced mixing of food, while the clearance spaces are used for receiving and discharging the food. This configuration allows for a more intensive and thorough mixing and comminution of food in a minimum of time.

22 Claims, 7 Drawing Sheets

U.S. PATENT DOCUMENTS

| | | |
|---|---|---|
| 5,360,170 A | 11/1994 | Cartellone |
| 5,366,286 A | 11/1994 | Ruttimann .................. 366/129 |
| 5,368,384 A | 11/1994 | Duncan et al. ............. 366/129 |
| D358,293 S | 5/1995 | Sebastia ...................... D7/376 |
| D361,241 S | 8/1995 | Littmann ..................... D7/376 |
| D362,586 S | 9/1995 | Deros ........................... D7/376 |
| D383,938 S | 9/1997 | Littmann ..................... D7/379 |
| D392,504 S | 3/1998 | Lallemand ................... D7/379 |
| D396,775 S | 8/1998 | Arita et al. .................. D7/379 |
| D398,809 S | 9/1998 | Henderson ................... D7/376 |
| 5,803,598 A | 9/1998 | Harry et al. ................. 366/129 |
| 5,810,472 A | 9/1998 | Penaranda et al. .......... 366/129 |
| D400,756 S | 11/1998 | Henderson ................... D7/376 |
| 5,836,684 A | 11/1998 | Safont et al. ............... 366/129 |
| 5,863,118 A | 1/1999 | Ackels et al. ................ 366/129 |
| 5,871,278 A | 2/1999 | Harry et al. ................. 366/129 |
| D408,214 S | 4/1999 | Cousins ........................ D7/376 |
| D426,105 S | 6/2000 | Littmann ..................... D7/376 |
| 6,186,056 B1 * | 2/2001 | Bruno et al. |
| 6,186,656 B1 * | 2/2001 | Penaranda et al. |
| 6,293,691 B1 * | 9/2001 | Rebordosa et al. |

FOREIGN PATENT DOCUMENTS

| | | | |
|---|---|---|---|
| CH | 288357 | 5/1953 | .................. 366/129 |
| CH | 423 118 | 4/1967 | |
| DE | 1031483 | 6/1958 | .................. 366/129 |
| DE | 1 779 951 | 10/1958 | |
| DE | 1827920 | 7/1960 | .................. 366/129 |
| DE | 1170120 | 5/1964 | .................. 366/129 |
| DE | 1256370 | 12/1967 | .................. 366/129 |
| DE | 1429176 | 10/1968 | .................. 366/129 |
| DE | 3306989 | 8/1984 | .................. 366/129 |
| DE | 43 21 653 A1 | 1/1995 | |
| DE | 43 22 280 A1 | 1/1995 | |
| DE | 195 04 538 A1 | 8/1996 | |
| GB | 2213399 | 8/1989 | .................. 366/129 |

* cited by examiner

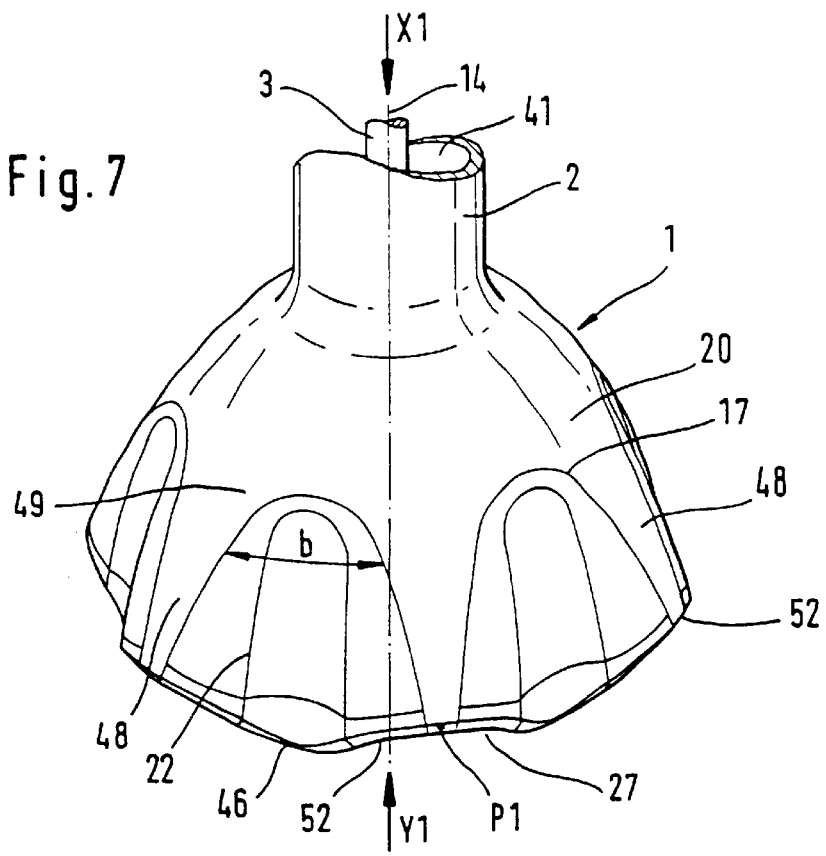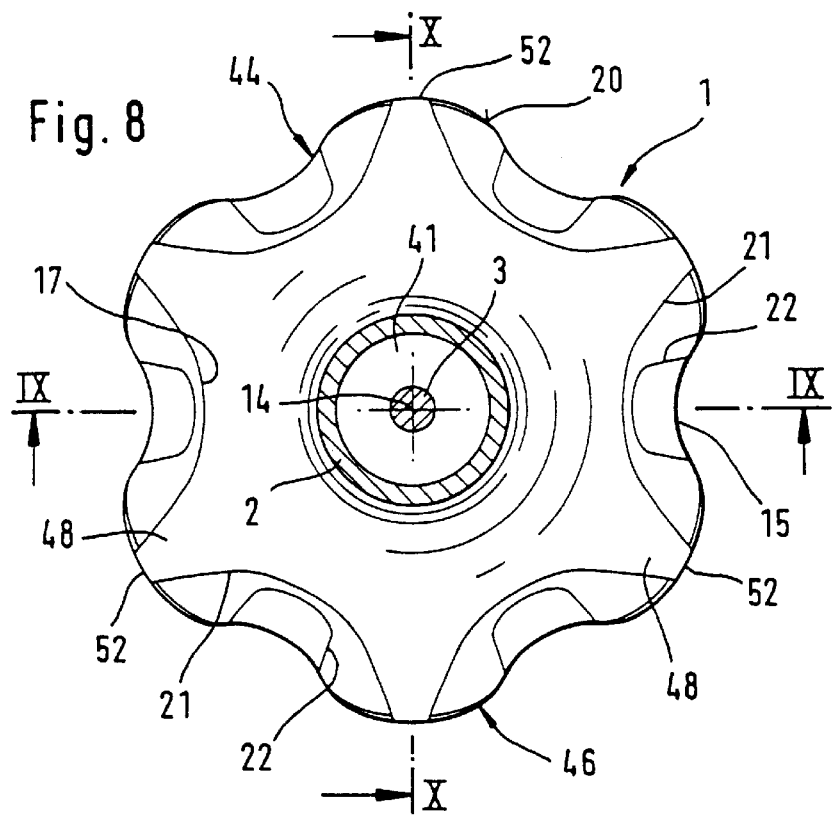

BELL-SHAPED SHIELD FOR USE ON A HOUSEHOLD APPLIANCE, PARTICULARLY A HAND BLENDER OR A HAND MIXER

This is a continuation of U.S. application Ser. No. 09/641,734, filed Aug. 18, 2000, now abandoned; which is a continuation of PCT application Ser. No. PCT/EP99/01656, filed Mar. 13, 1999; which claims priority from German application serial number 19812541,0, filed Mar. 12, 1998.

BACKGROUND

This invention relates to a bell-shaped shield for use on a household appliance, particularly a hand blender or a hand mixer, having a space formed by the inner wall of the shield and accessible from the bottom via an opening through which food is supplied and discharged, a blade-like processing tool inside the space being adapted to be set in rotation by a drive shaft so that the food is caught, comminuted and/or mixed by said tool.

A shield of this type is known from U.S. Pat. No. 3,299,924, for example. The shield continues in upward direction in a sleeve provided with a bore in which a drive shaft is rotatably mounted and carried in bearings so as to be supported axially. The drive shaft extends through the wall of the shield via a bore, projecting with its free end a small amount into the space of the essentially bell-shaped shield. On this free end is a blade-like processing tool for comminuting and mixing or puréeing food materials, said processing tool being constructed to extend in a direction transverse to the longitudinal direction of the drive shaft. The other end of the drive shaft is connected by way of a coupling device to an electric motor of a hand mixer. The drive shaft extends concentrically with the sleeve and the shield.

With the hand mixer in operation, food is drawn by the rotary movement of the processing tool through the opening at the free end of the shield, comminuted and, on account of the centrifugal forces generated by the blade, expelled through the slits provided in the wall of the shield. Hence with the appliance activated for a time of some length, the food is returned repeatedly to the processing tool where it is reduced and expelled again out of the shield. As this occurs, it is possible, of course, not only for the food materials to escape to the outside through the slits but also for parts of it to escape over the brim of the opening from where they are then drawn in again centrally by the processing tool. When using the hand blender attachment the food is therefore comminuted, mixed and aerated. The latter occurs when the processing tool rotates at sufficiently high velocity and the suction forces are of a magnitude causing air to be drawn in from the surface. This can also happen, however, when the shield plus drive mechanism is frequently lifted, meaning that it is moved close to the surface of the food and not only held at the bottom of the vessel filled with largely liquid. food. With this mixing device it is difficult to achieve thorough reduction and mixing of the food in a minimum of time because the inside space of the shield is of a more or less rotationally symmetrical configuration.

It is an object of the present invention to provide a shield for a rotary processing tool of a household appliance, particularly an electric hand mixer or a hand blender, with which it is possible to mix, comminute and aerate the food far more intensively in a minimum of time. Furthermore, it is desirable that the shield afford ease of manufacture and cleaning.

SUMMARY OF THE INVENTION

This object is accomplished in accordance with the present invention by equipping a shield with bulges on its inner surface the food materials drawn in by the processing tool as the result of the suction forces arising during its rotation are caught and expelled radially outwardly and simultaneously in peripheral direction. According to the invention the food is fed into the bulges, which lie further out radially, as well as against the wall sections. That part of the food which impacts against the wall sections is decelerated there and diverted so that a major part of it is returned to the processing tool where it is reduced and mixed again. A further part of the food gets into the bulges and is moved downward and out through the opening. The result therefore is a continuous mixing, comminuting and aerating cycle.

The bulges have the effect of producing a particularly turbulent flow in the space of the shield, causing the food materials to be intensively mixed and reduced. Large pieces of food are also better caught by the processing tool when they enter the bulges, are trapped there and directed back to the processing tool. Owing to the fact that the food moves in the bulges at a lower speed and may even come to a stand-still there occasionally, also such food materials as project into the bulges in the space between the radial outer edge of the blade and the inner wall of the shield, such as large pieces, can be decelerated to such an extent that, when caught by the processing tool, they are still so sluggish as to be easily cut by the fast running blade. As a result of the bulges the kinetic energy transmitted to the food in the form of radially and peripherally directed movement in addition to the cutting energy from the processing tool also causes pieces of food lying against the inner wall of the shield to be abruptly diverted in their movement. Part of the food materials are even returned to the processing tool and immediately cut again, mixed and conveyed outwards.

As mentioned in the foregoing, the processing tool is preferably a blade having crescent-shaped elements extending radially away from both sides of the drive shaft and equipped with cutting edges on their leading sides as seen in the direction of rotation, said crescent elements—like a propeller —being twisted and set in such a way as to produce a type of pumping effect causing the food to be drawn in by the processing tool and then expelled radially outwards. The shield forms a certain mixed circuit by which already reduced food as well as food that is still unreduced is fed towards and away from the blade, comminuted and mixed. A large portion of the food is also expelled from the shield radially outwardly allowing new food to enter the space of the shield through the opening when passages are constructed in addition laterally in the wall of the shield.

With the bulges extending in the longitudinal direction of the shield they are readily accessible for cleaning from the opening. The bulges may have a cross section of any desired shape such as angular, tapered, semicircular, oval, etc. It is to be noted, however, that the elevations adjoining each bulge laterally must not extend radially inwards into the blade's radius of action. According to the invention it could even suffice for just a single clearance space to be constructed on the inner wall of the shield. It is particularly advantageous, however, for several clearance spaces to be spread around the circumference of the inner wall as this generates a particularly turbulent flow in the space of the shield.

In order to be able to hold the shield particularly steady and free from vibrations during the mixing or comminuting operation it is an advantage for the clearance spaces to be spaced evenly apart on the inside of the circumference and to be constructed if possible with the same dimensions. The opening of the shield is preferably always bigger than the biggest diameter of the blade. It will be appreciated that smaller diameters could be selected for the opening but this might have an adverse effect on cleaning and installing the blade in the space of the shield.

Providing bulges that extend in the direction of the drive axis of the shield, taking the shortest route results in a particularly vertical impact of the food against the inner wall of the shield, producing optimal puréeing, comminuting and mixing results. A shield of this type is also easy to move back and forth and up and down in a vessel.

In one embodiment, the bulges emerge as elevations on the contour of the envelope surface. In this arrangement the wall of the shield is selected just thick enough for the clearance spaces constructed on the inner side to form elevations on the outer envelope surface. It would also be conceivable, however, for the outer envelope surface to have no elevations, meaning for it to have a smooth surface. In this case the wall of the, shield would have to be selected thick enough for the bulges to be able to penetrate far enough in to the material of the wall.

On a thin-walled shield wherein elevations result between the bulges on the inner wall, the elevations forming in turn constrictions on the envelope surface of the shield, such features result in elevations on the outer surface radially opposite the bulges, while the elevations constructed on the inner side between two clearance spaces become constrictions on the outer envelope surface. A shield of this form is a particularly material-saving, economical, and easy-to-handle solution and is particularly simple to manufacture as a plastic injection-molded part.

In one embodiment, the inner wall of the shield provided with the bulges and the elevations is formed of rings shaped in an undulating or zigzagging configuration in cross section. This arrangement provides for a particularly advantageous shape of the shield wall, with the added effect that the wall extends concentrically with the drive axis. The undulating or zigzagging configuration of the shield wall also extends symmetrically to the drive axis of the shield when looking vertically into the opening of the shield from underneath. It will be understood, of course, that other shapes of wall are also possible, the important thing being that the wall be equipped with groove-shaped, flute-like or stud-type bulges which result in the advantages described above.

In one embodiment, the envelope surface of the shield forms rings shaped in an undulating or zigzagging configuration in cross section, the rings extending concentrically with the inner rings and being congruent therewith. In this arrangement, the outer envelope surface is always equidistant from the inner wall, i.e., the shield wall is the same thickness in this area all around the circumference.

According to another feature of the invention, the bulges and the constrictions increase in width over their entire length towards the opening. Thus, the clearance spaces increase in depth relative to the shield wall the closer they get to the opening so that mixing, comminuting and the bursting of air bubbles increases towards the opening at the brim. The suction power of the processing tool and the acceleration of the food into the inside of the shield are also greatest in the area of the processing tool, i.e., including the area where the bulges have the deepest profiles.

According to another feature of the invention, the bulges and the constrictions increase in width over their entire length towards the opening. Thus, the width of the bulges on the inner surface and hence the width of the elevations on the outer envelope surface increase towards the opening of the shield, i.e., the shield has a particularly homogenous form.

It should be noted at this point that the term "constrictions" is used for those flutes which an observer recognizes when looking at the surface of the shield from the outside. If the observer looks into the opening vertically from underneath, these constrictions form inwardly extending bulges. Similarly, the adjoining elevations form the bulges on the inner wall.

According to another feature of the invention, the constrictions extending on the envelope surface away from the opening run out in such a way as to end on the envelope surface in the upper end section of the shield. The constrictions in the bell-shaped envelope surface of the shield run out towards the shank because they extend essentially parallel to the drive axis of the shield and the envelope surface of the shield is of a tapering configuration upwards to the drive axis, extending obliquely to the drive axis. The same applies accordingly to another feature of the invention in which the bulges on the inner wall become progressively smaller towards the upper end section, eventually even running out on the inner wall in the upper end so that the inner wall of the shield returns to a circular shape in the upper zone. Here it is thus possible to insert a cap penetrated by the drive shaft to seal off the interior of the shield from the upper space. The upper space is connected to the space of an electric drive mechanism via a bore in which the drive shaft runs. The bore extends in a shank integrally molded to the shield at the end remote from the opening.

Since outer and inner diameter of the shield increases towards the opening it is an advantage for the bulges on the inner side and the constrictions on the envelope surface to also increase in width towards the opening. This enhances the discharge of the food materials in the clearance spaces formed by the bulges.

It is also conceivable, however, for the bulges and the constrictions to be arranged to extend helically at an angle to the drive axis, i.e., either in the opposite or the same direction of rotation as the blade. This has the added effect of enabling the food to be adjusted in its direction of movement either obliquely upwards or obliquely downwards in the longitudinal direction of the bulges, depending in which direction the food impacts against the inner wall of the bulges. It is also possible however for the constrictions to be constructed in the form of stud-like recesses in the wall of the shield extending into the brim of the opening.

According to another feature of the invention, the brim of the shield bounding the opening has not only bulges extending in longitudinal direction along the inner side of the shield but also wave troughs extending along the brim of the shield, the troughs producing passages which also allow part of the food materials to escape radially outwardly from the shield. This is an advantage in particular when the brim of the shield opening rests on the bottom of a vessel because then the food could no longer escape to the outside through the opening closed by the bottom of the vessel but only through the passages.

With an undulating or zigzagging configuration of the shield brim the indentations create a corresponding number of passages through which the food can escape to the outside. These shapes also enable a symmetrical arrangement as is the case with the bulges and the constrictions. The undulating or zigzagging configuration of the brim of the opening coincides in radial direction with the constrictions and elevations, resulting accordingly in a brim zone extending in three planes.

According to another feature of the invention, the wave troughs form the deepest or the furthest projecting points in the longitudinal direction of the shield looking at the shield from the front so that they form a plane which, when placed on the smooth bottom of a vessel, falls in the plane of the bottom. This is achieved structurally by having the end of the brim lie on the inner side of an imaginary conical funnel surface whose apex lies underneath the opening on the drive axis of the recess. Consequently the radially outer zones of the brim, i.e., the walls of the bulges (seen from inside), are intersected earlier than those zones which are radially closer to the drive axis, as is the case with the elevations This results in the lateral passages at the lower brim.

It is also conceivable, however, for the constriction with a wave crest looking from the outside and for the bulge with a wave crest looking from the inside to cooperate with the indentations. This is achieved by having the end of the brim extend along the outer surface of a cone so that the apex of the cone lies advantageously in the area of the recess or in the area of the shield shank on the drive axis. In this case the peaks of the wave troughs of the recess form the front-most end zone while the wave crests of the indentations are recessed. Hence the wave troughs form the support surface of the hand mixer or of the hand blender shank coupled to a household appliance. The passages are then formed by the wave crests. In this configuration, however, the cone angle must not be smaller than that permitted by the curvature of the shield as otherwise the passages will become too big or too much stock will be cut off the shield wall.

A shield wall of constant thickness is achieved by another feature of the invention in which the surface of the inner wall extends so as to be congruent with the envelope surface of the shield.

A particularly homogeneous and enclosed form of the shield with a constant thickness is achieved by another feature of the invention in which the bell-shaped shield extends concentrically with the drive axis and the brim extends symmetrically thereto.

BRIEF DESCRIPTION OF THE DRAWINGS

FIG. 7 is a perspective side view of a second shield illustrating a second embodiment of the invention;

FIG. 8 is a view of the shield of FIG. 7 looking from above in the direction of X1;

DETAILED DESCRIPTION

Figure 1:
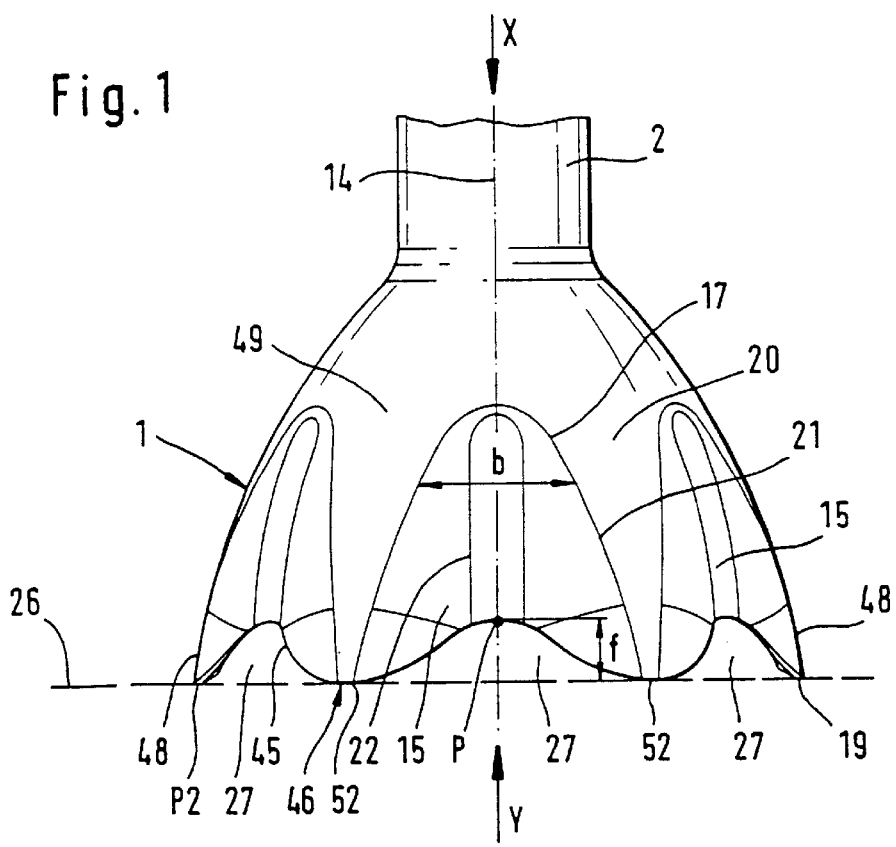
FIG. 1 is a side view of a shield illustrating a first embodiment of the invention.
Figure 2:
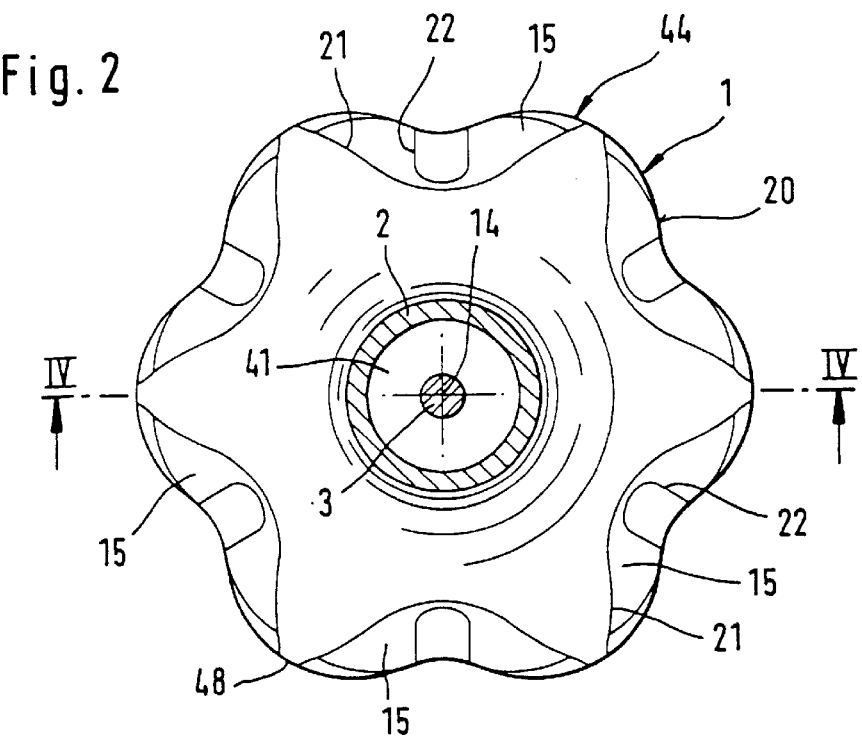
FIG. 2 is a top plan view of the shield of FIG. 1 looking from above in the direction of X.

FIGS. 1 to 13 show two embodiments of a shield 1 which in accordance with FIGS. 1, 4, 6, 7, 9, 10, 12 and 13 is of a bell, tulip or umbrella like configuration expanding radially outwardly in downward direction. All such shapes are grouped in the invention under the single term "bell-shaped", i.e., all such shapes are to be understood as coming within the scope of the present invention. The shield 1 gives way at the top to a shank 2 which is connected to a housing, not shown in the drawings, of a preferably electric drive mechanism. Extending inside the shank 2 is a drive shaft 3 which is in rotating connection with an electric motor, not shown in the drawings. In the shank 2 the drive shaft 3 is rotatably carried in bearings, not shown in the drawings.

The shank 2 projects in accordance with FIGS. 4, 5, 6 and 11 to 13 through a bore 4 provided in a cover plate 5 into the space 6 of the shield 1. The cover plate 5 is tightly clipped, adhesive bonded, screwed or otherwise fastened so as to effect a tight seal, to the inner wall 7 of the shield 1 by sealing means not shown in the drawings. The bore 4 is likewise sealed from the drive shaft 3 so that neither water nor food materials are allowed to reach the interior 41 of the shank 2 and possibly cause damage to the inner parts of a drive mechanism.

At this point it should be noted that the shield 1 and the shank 2 are part of a hand blender, not shown in the drawings, or an adapter for coupling to a drive mechanism such as a hand mixer. It should also be noted that the same reference characters are applied to functionally similar components in FIGS. 1 to 13 in order to simplify the description. Similarly the cover plate 5, the drive shaft 3 and the processing tool 8 constructed as a blade are not shown in FIGS. 9 and 10 for the sake of simplicity.

Figure 3:
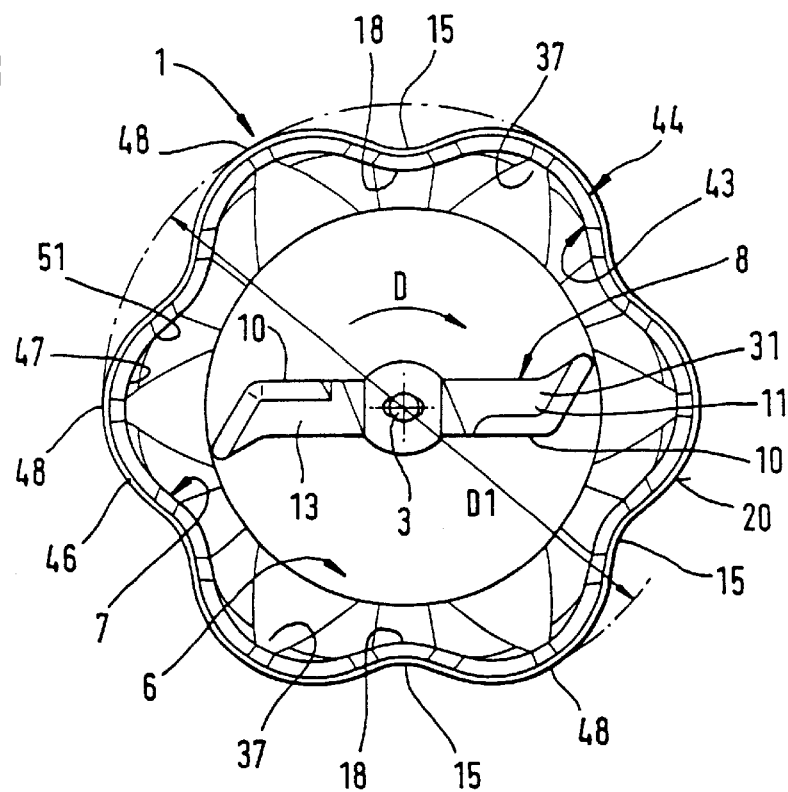
FIG. 3 is a view of the shield of FIG. 1 looking from underneath in the direction of Y.
Figure 4:
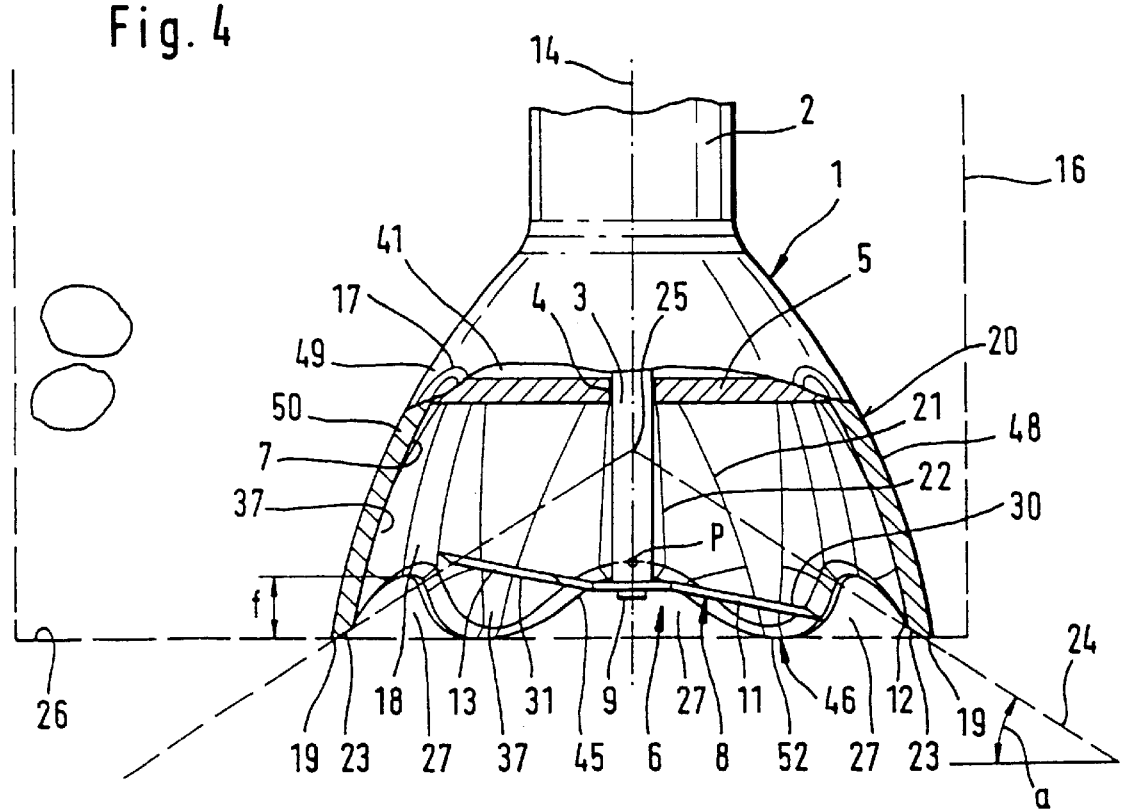
FIG. 4 a longitudinal sectional view of the shield, taken along the line IV—IV of FIG. 2.
Figure 5:
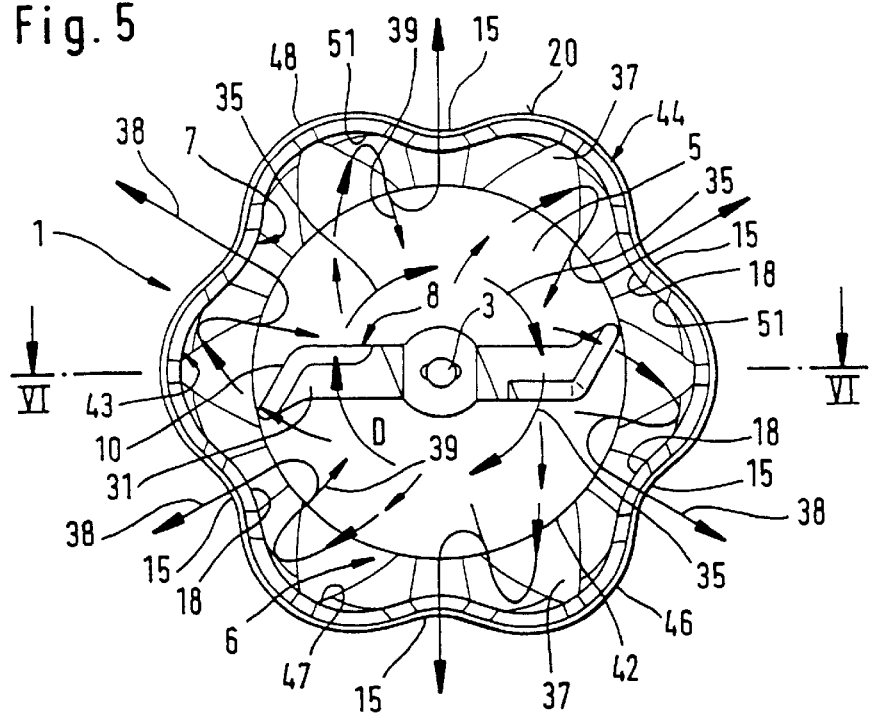
FIG. 5 is a view of the shield of FIG. 1 looking from underneath in the direction of Y, arrows indicating approximately the path which the food, reduced and accelerated by the blade inside the shield, takes as it enters and leaves the shield.
Figure 11:
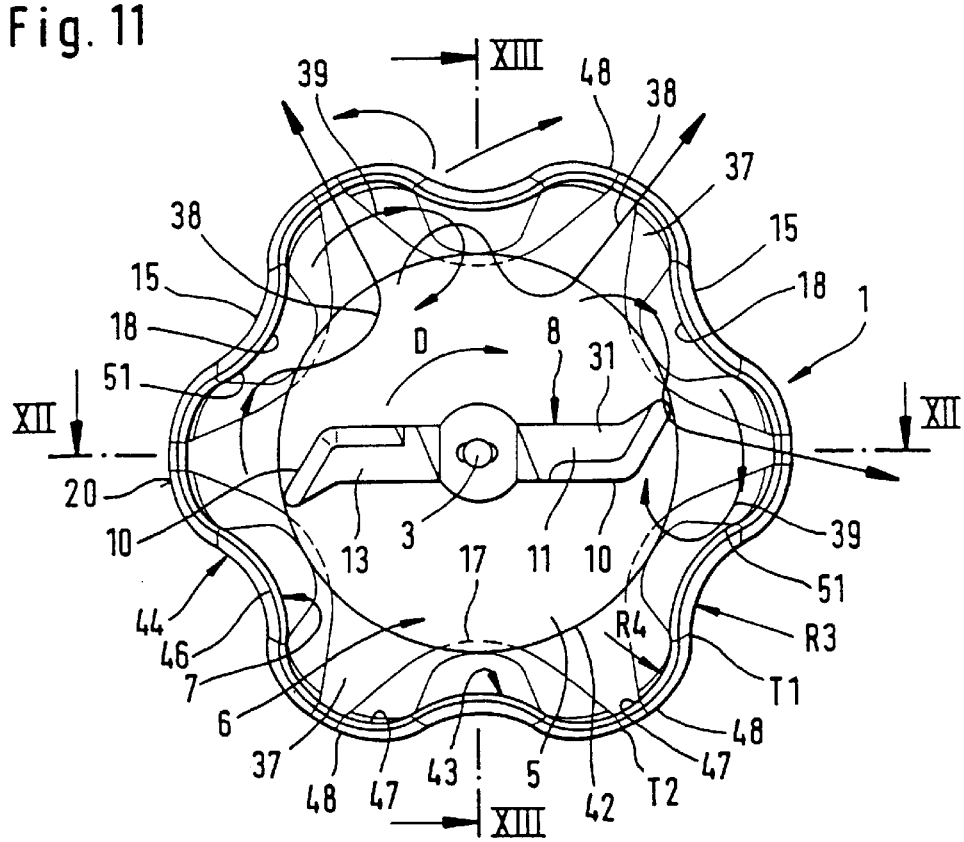
FIG. 11 is a view looking from underneath into the second embodiment of the shield in the direction Y1 of FIG. 7, with arrows used once again to indicate the path of the food into and out of the shield in just a single sector for the sake of simplicity.
Figure 12:
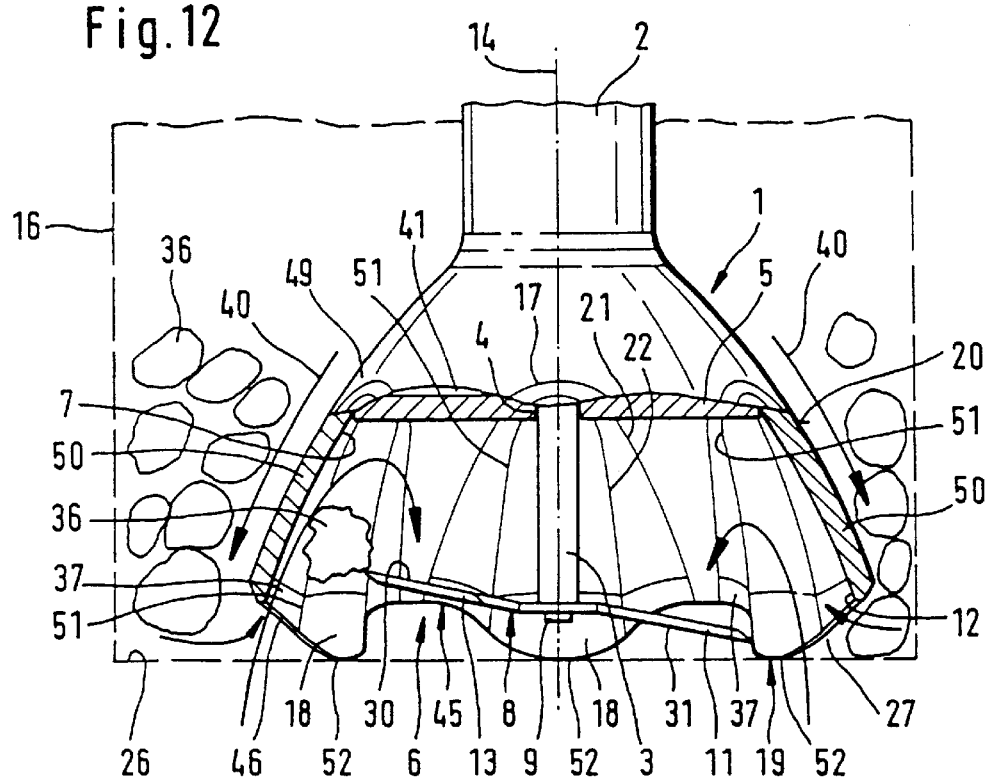
FIG. 12 is a longitudinal sectional view of the shield of the second embodiment, taken along the line IX—IX of FIG. 8, showing the processing tool inside the shield and arrows indicating again the possible path of the food into and out of the shield.
Figure 13:
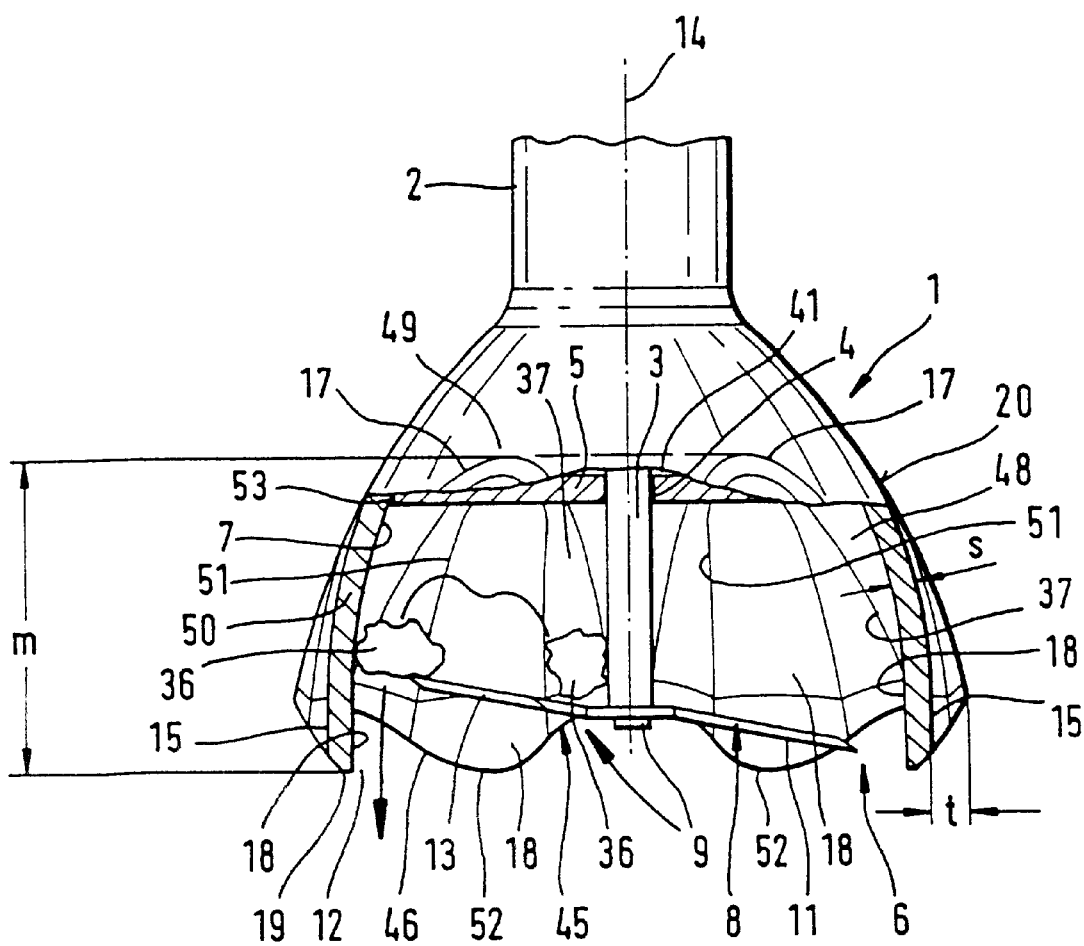
FIG. 13 is a longitudinal sectional view of the shield of the second embodiment, taken along the line X—X of FIG. 8, showing likewise the processing tool inside the shield and at the same time arrows indicating the possible path of the food into and out of the shield. The shield is again shown turned 180° anti-clockwise in the plane.

According to FIGS. 3 to 6 and 11 to 13 the free end 9 of the drive shaft 3 is equipped with a blade 8 which, acting as processing tool, is fastened to the drive shaft 3 as by caulking, welding, screwing or similar fastening techniques. The blade 8 extends diametrically to both sides of the drive shaft 3 and has cutting edges 10 on its leading faces in the direction of rotation D in accordance with FIGS. 3, 5 and 11. As FIGS. 4, 12 and 13 show, the one blade leg 11 points obliquely downwards to the opening 12 of the shield while the other blade leg 13 is inclined slightly upwards into the interior of the space 6. This results in the blade 8 cutting in different cutting planes, thus achieving a better cutting action per revolution. At the same time this offset arrangement of the blade legs, plus twisting of the blade 8 transverse to the legs 11, 13 (not shown) has the effect that on rotation food materials are drawn into the space 6 of the shield 1 where they are mixed and comminuted and expelled out through the opening 12. The drive shaft 3 projects far enough into the space 6 of the shield 1 for the blade 8 to be positioned in close proximity to the opening 12 but still far enough away from the opening 12 so that reaching Over the shield 1 from the side does not cause any injury to the user.

The shield 1 has constrictions 15 extending along the envelope surface 20 in the longitudinal direction of its drive axis 14, the constriction depth t (FIG. 13) decreasing towards the top and running out at a point roughly level with the cover plate 5 on the outermost envelope surface 20 in the upper end section 49, as is illustrated in the Figures by the lines 17 on the outermost envelope surface 20. The runout of the constrictions 15 on the envelope surface 20 and accordingly of the bulges 47 on the inner wall 7 occurs at such a level of the shield 1 that a circular surface 53 (FIG. 13) can be formed on the envelope surface 20 and on the inner wall 7 in this particular area, thus enabling the likewise circular cover plate 5 to be fitted, fastened and sealed to good effect in this area. The constrictions 15 or bulges 47 are shaped so that their wall thickness s correlates essentially with the overall wall thickness of the shield 1, i.e., the area where the envelope surface 20 becomes a constriction produces a corresponding elevation 18 (FIG. 13) on the inner wall 7. It should also be noted that the terms bulges 47 and elevations 18 are used simultaneously in the description;

this is so because it is assumed that the prior art has knowledge of an annular inner wall which is then equipped in accordance with the invention with bulges 47 and elevations 18. If, on the other hand, a prior art was taken as basis in which the inner wall of the shield represents the reference quantity, then there would only be bulges 18 constructed on the inner wall in accordance with the invention. On this basis it would no longer be possible to speak of constrictions. The first definition appears to make more sense, however, since it is better at describing the undulating configuration of the shield 1.

Figure 9:
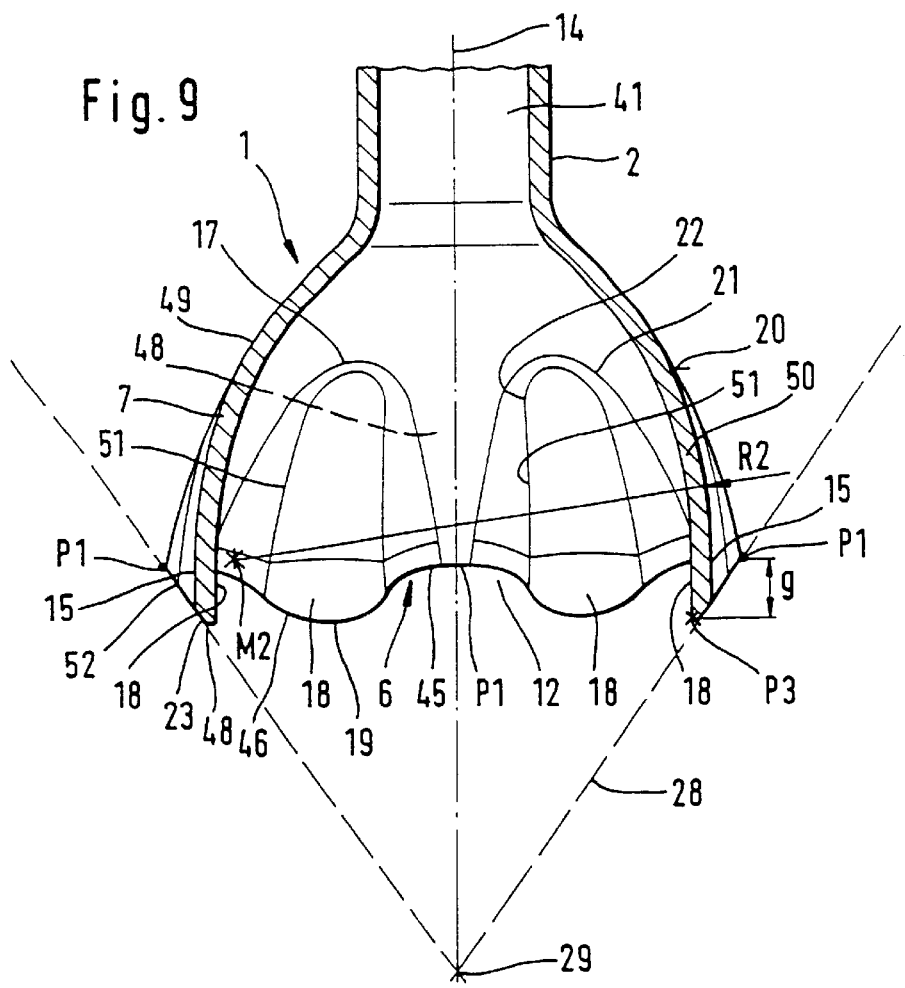
FIG. 9 is a longitudinal sectional view of the shield, taken along the line IX—IX of FIG. 8, but without a processing tool and cover plate.
Figure 10:
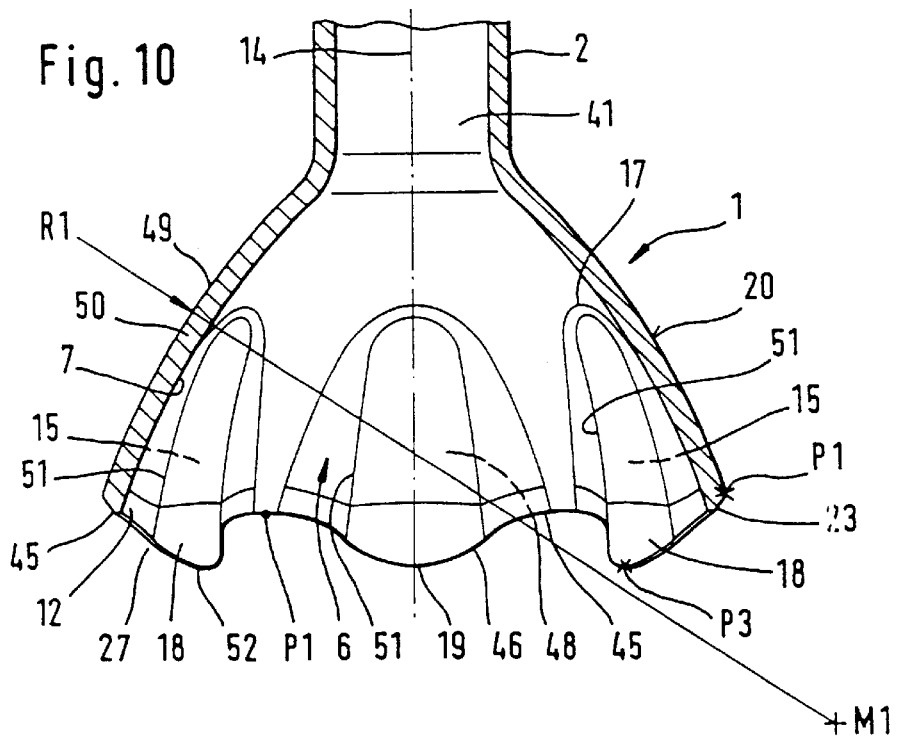
FIG. 10 is a longitudinal sectional view of the shield, taken along the line X—X of FIG. 8, but without a processing tool and cover plate, showing the shield turned 180° anti-clockwise in the plane.

The constrictions 15 are uniformly spaced and dimensioned around the circumference of the shield 1 so that, given a maximum diameter D1 of around 80 mm, a total of six constrictions 15 results according to FIG. 3. It is possible, of course, for fewer or more constrictions 15 to be evenly or unevenly distributed around the circumference. The depth t of the constrictions 15 equals around 9 mm while the distance m between the support surface 19 and the runout of the constrictions 15 at the lines 17 is approximately 35 mm (FIG. 13). In this case the radius R1 described about the centerpoint M1 equals around 96 mm (FIG. 10). This radius R1 forms the radially outermost envelope surface 20 of the shield 1 on points devoid of constrictions 15. The deepest area of the constrictions 15 is defined by a radius R2 described about the centerpoint M2. This radius equals around 60 mm (FIG. 9). While the centerpoint M1 lies outside the shield 1 and underneath the opening 12, the centerpoint M2 is situated in close proximity to the opening 12 inside the space 6 of the shield 1, i.e., the envelope surface 20 of the shield 1 has a smaller curvature in the radially outer area than in the deepest area of the constrictions 15. This means that the radially outermost area opens in its cross section towards the end, meaning that it widens more outwardly than is the case in the area of the constrictions 15 where this area is more closed, meaning that it closes somewhat again towards the free end of the opening 12.

As can be seen from FIG. 12, the outer fictitious edge 21 marks the area where the constrictions 15 on the restructured, smooth areas of the envelope surface 20 begin while the inner fictitious edge 22 represents the beginning of the trough bottom of the constrictions 15, i.e., this is the area in which the trough bottom 22 is defined by the radius R3 (FIG. 11). This radius equals around 11 mm. There are minor differences between the area of the trough bottom 22 on the shield 1 of FIGS. 1 to 6 and that on the shield 1 of FIGS. 7 to 13. In the first embodiment the inner fictitious edges 22, which form a trough bottom and are defined by the wall section 51, are narrower than on the second embodiment where the trough bottom 22 even widens towards the free end of the shield 1. Furthermore, the constrictions 15 also widen towards the opening 12, i.e., the width b increases constantly in this direction (FIGS. 1 and 7). The dimension m reflects the height at which the constrictions 15 and the bulges 47 end at the upper end section 49.

As shown in the Figures looking onto the shield 1 from underneath and from above (FIGS. 2, 3, 5, 8 and 11), the radially outer contour is formed by a ring 44 extending in undulating fashion, i.e., it is defined by radii R3, R4 and tangents T1, T2 applied to these radii (FIG. 11). It will be understood, of course, that other configurations following a rectangular or triangular zigzag course may also be contemplated. According to the cross sections of FIGS. 2, 3, 5, 8 and 11 the inner wall 7 is formed likewise by a ring 43 which extends concentrically with the outer ring 44 and follows the contour of the outer ring 44.

Figure 6:
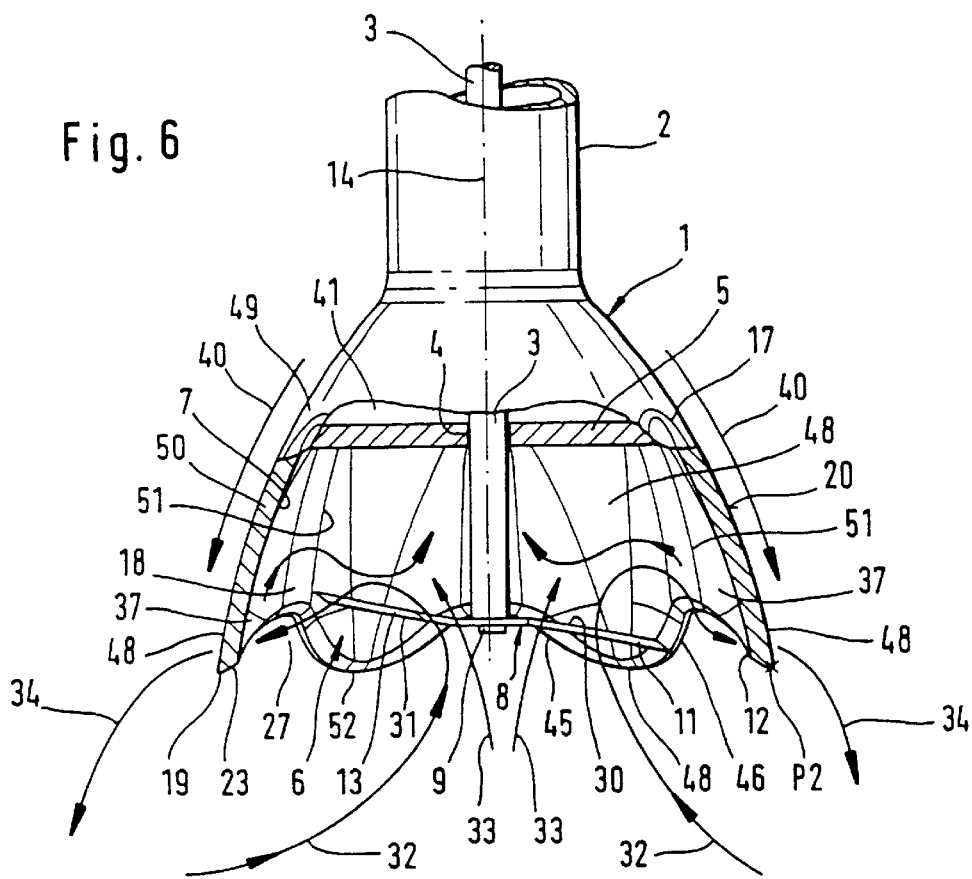
FIG. 6 is a longitudinal sectional view of the shield, taken along the line IV—IV of FIG. 2, with the path taken by the food into and out of the shield and illustrated in FIG. 5 being shown as well.

According to FIGS. 4 and 6 the end surface 23 forming the opening 12 of the shield 1 of the first embodiment runs obliquely downwards at an angle a (FIG. 4. This end surface 23 lies on an imaginary conical envelope surface 24 whose apex 25 lies on the drive axis 14 of the shield 1. Hence in the embodiment of FIGS. 1 to 6 the end surface 23 lies on a conical envelope surface 24, i.e., the constrictions 15 which do not lie in the same plane of the conical envelope surface 24 are not cut by the conical envelope surface 24 until a corresponding distance f from the bottom—depending on their depth as a function of height and diameter. This results in an undulating course of the end surface 23 in Y, Y1 direction (FIGS. 3 and 11) as well as in the side views of FIGS. 1 and 7 so that, when the shield 1 is put down on a surface 26 of a table or bowl bottom 26 (FIGS. 4 and 12), passages 27 form between the individual support surfaces 19 of the shield 1 through which the food materials 36 are allowed to pass into and out of the space 6 of the shield 1. Hence in FIGS. 1 to 6 the passages 27 border on the constrictions 15. According to FIGS. 1 to 7 this conic section thus produces wave troughs 45 and wave crests 52 which are bounded by the passages 27. The same applies for the shield 1 of FIGS. 7 to 13, although in this case a different conic section is taken, as will be described in more detail in the following.

Unlike the shield 1 of FIGS. 1 to 6, where the deepest points P (FIGS. 1, 4 and 6) form the biggest distance f of the passages 27 to the outermost points P2 of the support surface 19, in FIGS. 7 to 13 of the second embodiment the distance g is formed by the points P1 (FIG. 9) of the radially outer envelope surface 20 and the points P3 on the support surface 19, i.e., the passages 27 are formed between two constrictions 15, meaning in the area of the bulges 47.

The second embodiment of the shield 1 is thus achieved, as shown in particular in FIG. 9, by applying an imaginary conical surface of a funnel 28 against the end surface 23 so that the support surface 19 forms the furthest projecting point P3 representing the point of intersection between the end surface 23 and the inner wall 7 in an elevation 18. The most remote point P1 with the biggest distance g forms the highest point of the outermost envelope surface 20 and represents the point of intersection between the brim surface 46 and the envelope surface 20. This results accordingly in a shield 1 which looks somewhat different in its outer appearance than that of FIGS. 1 to 6. While in the case of the imaginary funnel 28 of the second embodiment the apex 29 lies on the same side as the opening 12 of the shield 1, meaning that it faces the opening (FIG. 9), in the first embodiment of FIG. 4 the apex 25 is turned away from the opening 12, meaning that it lies above the opening on the drive axis 14.

In the first embodiment the support surface 19 is constructed on the wave crests 52 of the brim 46, while in the second embodiment the support surface 19 is constructed on the wave troughs 45 of the brim 46.

Both embodiments are equally well suited for the good and fast mixing and comminuting of food materials.

The mode of operation of the mixing, blending, emulsifying and comminuting device using the shield of the present invention is as follows:

After food materials 36 are placed in a vessel 16 (both being shown only schematically in FIGS. 4 and 12) the shank 2 with its shield 1, in its capacity as part of a hand blender or as plug-on attachment for some other electrically powered processing appliance such as a hand mixer, is immersed in the vessel 16 far enough for the support surface 19 of FIG. 4 to touch the bottom 26 of the vessel 16. It is also possible, of course, for the support surface 19 of the shield 1 to be held at a certain relative distance to the surface 26, the important thing being that the blade be essentially in contact with the food 36.

The drive motor, not shown in the drawings, of the hand blender is now switched on and the drive shaft 3 begins to rotate in the direction of rotation D (FIGS. 3 and 11). The speed of the processing tool 8 constructed as a blade may lie advantageously between 3,000 and 15,000 revolutions per minute. Rotation of the blade 8 causes the food materials 36, illustrated schematically by way of example only in FIGS. 12 and 13 of the second embodiment of the shield 1, to be caught and cut into small pieces by the cutting edges 10 of the blade 8. Liquid food glides along the top and bottom side 30, 31 of the blade 8 so that it is fed into the space 6 of the shield 1 and then back out of the shield 1 again on account of the gradient of the legs 11, 13 of the blade 8, as is indicated by the sequence of arrows 32 in FIG. 6. At the same time liquid food 36 is drawn by the blade 8 from the center of the shield 1 into the space 6, as is indicated by the arrows 33. The sequence of arrows 32 shows that the food 36 ultimately reaches the outside again through the passages 27, as is indicated by the arrows 34 in FIG. 6. At the same time the food 36 is also caused to circulate, as is indicated by the arrows 35 in FIG. 5. After a certain time this food 36 also leaves the shield 1 through the passages 27 or the opening 12 on account of the centrifugal forces generated by the circular movement.

When the food 36 is expelled by the blade 8 radially outwardly and at the same time in the circumferential direction D, a large part of the food 36 also gets into the groove-like bulges 47 constructed on the inner wall 7 of the shield 1 between two elevations 18 and taking the shortest route in the direction of the drive axis 14, as seen looking into the space 6 of the shield 1 from underneath (FIGS. 3, 5 and 11) and into the inner wall 7 in the longitudinal sections of FIGS. 4, 6 and 12 to 13. As seen looking at the inner wall 7, the constrictions 15 formed on the envelope surface 20 become elevations 18, while the elevations 48 formed on the envelope surface 20 become bulges 47 forming clearance spaces 37. The food 36, be it large pieces, small pieces or liquid, is also fed by the blade 8 into these clearance spaces 37 where it is decelerated and diverted on the walls 50 of the bulges 47. When large pieces of food 36 get into the bulges 47 and also project into the radius of action 42 of the blade 8 they are caught by the tips of the cutting edges 10, comminuted and fed radially outwardly in circumferential direction D or straight through the passages 27, as is indicated by the arrow pairs 38 and 39 in FIGS. 5 and 11, respectively. In the bulges 47, which extend over the entire length of the inner wall 7 as far as the cover plate 5, the walls 50 standing transverse to the direction of rotation D cause the food 36 to be abruptly decelerated, diverted and mixed thoroughly at the same time. As this occurs, a big part of the food returns into the radius of action 42 of the blade 8 and is cut again by the blade 8, accelerated again, fed into the next clearance space 37, decelerated again and diverted. Finally the outer lying food 36 is drawn in again by the blade 8, as indicated by the arrows 34 and the sequence of arrows 32, so that the same process starts from the beginning.

The arrows 40 pointing downwards a short distance from the envelope surface 20 of the shield 1 (FIGS. 6 and 12) indicate likewise that the food 36 is also drawn from the upper area and radially from outside in the direction of the opening 12. The shape of the shield 1 according to the invention has the effect of mixing, comminuting and hence puréeing the food materials 36 particularly thoroughly. With this construction, the passages 27 extend just far enough into the wall 50 of the shield 1 (dimension g) to essentially prevent any disagreeable splashing of the food 36 radially out of the shield 1. Food 36 is also accelerated, however, out of the clearance spaces 37 in the direction of the bottom 26. In this connection it is essential, of course, for the blade 8 to be arranged to extend largely in the upper areas of the passages 27. If it was positioned too close to the opening 12, the food 36 would splash too vigorously radially outwardly through the passages 27. The risk of the user injuring his hand would also be greater. The blade 8 is arranged in relation to the passages 27 so that its one leg 11 extends roughly centrally level with the passages 27 while the other leg 13 extends somewhat above the passages 27 (FIGS. 6, 12 and 13).

It should be noted at this point that the arrows 33, 34, 35, 38 and 39 are intended to indicate only the ideal flow of a few food particles. In practice it is possible to determine such flows only in global terms during operation of a hand blender equipped with the shield 1 constructed in accordance with the invention.

If the opening 12 of the shield 1 is raised far enough out of liquid food for the suction forces of the blade 8 to draw in air through the passages 27, this air will be intensively mixed in the space 6 of the shield 1 with the food 36, thus creating a particularly airy and frothy mass of food.

When the support surface 19 of the shield 1 rests flush on the bowl bottom 26 so that the food 36 can only escape through the passages 27, there is no longer any risk of the shield 1 sticking to the bowl bottom 26 since a connection exists at all times between the inside of the bowl and the space 6 inside the shield 1 through the passages 27. It is always easy, therefore, to lift the shield 1 off the bowl bottom 26 and lower it again without having to exert any great force.

What is claimed is:

1. A bell-shaped shield for use on a household appliance, the shield comprising:

an outer wall defining an envelope surface;

an inner wall defining a space within the shield, the space being solely accessible from a bottom of the shield via only one opening through which food is supplied and discharged; and a blade-like processing tool inside the space being adapted to be set in rotation by a drive shaft so that the food is at least one of caught, comminuted and mixed by said tool;

wherein the shield is of an essentially bell-shaped configuration, a surface of the inner wall is equipped on its circumference with several outwardly extending bulges for the formation of clearance spaces, and said bulges emerge as outward elevations on a contour of the envelope surface.

2. A bell-shaped shield for use on a household appliance, the shield comprising:

an outer wall defining an envelope surface;

an inner wall defining a space within the shield, the space being accessible from a bottom of the shield via an opening through which food is supplied and discharged; and a blade-like processing tool inside the space being adapted to be set in rotation by a drive shaft so that the food is at least one of caught, comminuted and mixed by said tool;

wherein the shield is of an essentially bell-shaped configuration, a surface of the inner wall is equipped on its circumference with several outwardly extending bulges for the formation of clearance spaces, said bulges emerge as outward elevations on a contour of the envelope surface, and inward elevations result between the bulges on the inner wall of the shield, said inward elevations forming, in turn, constrictions on the envelope surface of the shield.

3. The shield of claim 2, wherein the shield defines a drive axis and the bulges extend in a direction of the drive axis.

4. The shield of claim 3, wherein the bulges on the inner wall become progressively smaller towards an upper end section of the shield, eventually running out on the inner wall in the upper end section.

5. The shield of claim 2, wherein the inner wail of the shield is formed of inner rings shaped in an undulating or zigzagging configuration in cross section.

6. The shield of claim 2, wherein the inner wall forms inner rings and the envelope surface of the shield forms outer rings shaped in an undulating or zigzagging configuration in cross section, said outer rings extending concentrically with the inner rings and being congruent therewith.

7. The shield of claim 2, wherein the bulges increase in depth in a longitudinal direction towards the opening.

8. The shield of claim 2, wherein the bulges and the constrictions increase in width over their entire length towards the opening.

9. The shield of claim 2, wherein the constrictions extend on the envelope surface away from the opening, the constrictions running out in such a way as to end on the envelope surface in an upper end section of the shield.

10. The shield of claim 2, wherein the bulges and the inward elevations extend essentially parallel to a drive axis of the drive shaft, increasing in width towards the opening.

11. The shield of claim 2, wherein the bulges and the inward elevations extend obliquely at an angle to a drive axis of the drive shaft.

12. The shield of claim 2, wherein a brim of the shield bounding the opening, as seen looking in a side view at the shield from outside, has wave troughs and wave crests forming passages for the food materials in a radial direction.

13. The shield of claim 12, wherein the wave troughs and the wave crests, in combination with the brim, follow equally an undulating or zigzagging course as seen in a side view.

14. The shield of claim 13, wherein the bell-shaped shield extends concentrically with a drive axis of the drive shaft and that the brim extends symmetrically thereto.

15. The shield of claim 12, wherein the wave troughs coincide with the constrictions in such fashion that a deepest area of the constriction is coincident with a deepest area of the wave trough.

16. The shield of claim 15, wherein the surface of the inner wall extends so as to be congruent with the envelope surface of the shield.

17. The shield of claim 12, wherein the wave crests coincide with the constrictions in such fashion that a deepest area of the constriction is coincident with a highest area of the wave crest.

18. The shield of claim 17, wherein the surface of the inner wall extends so as to be congruent with the envelope surface of the shield.

19. The shield of claim 2, wherein the appliance is one of a hand blender and a hand mixer.

20. The shield of claim 4, wherein the space is solely accessible from said bottom of the shield via said opening.

21. The shield of claim 2, wherein the bulges are distributed symmetrically around the shield.

22. The shield of claim 2, wherein the surface of the inner wall expands radially outward over its entire extension downward to said bottom.

* * * * *